Dec. 21, 1954   H. B. CLARK   2,697,272
TOOLHOLDER
Filed Oct. 29, 1952   2 Sheets-Sheet 1
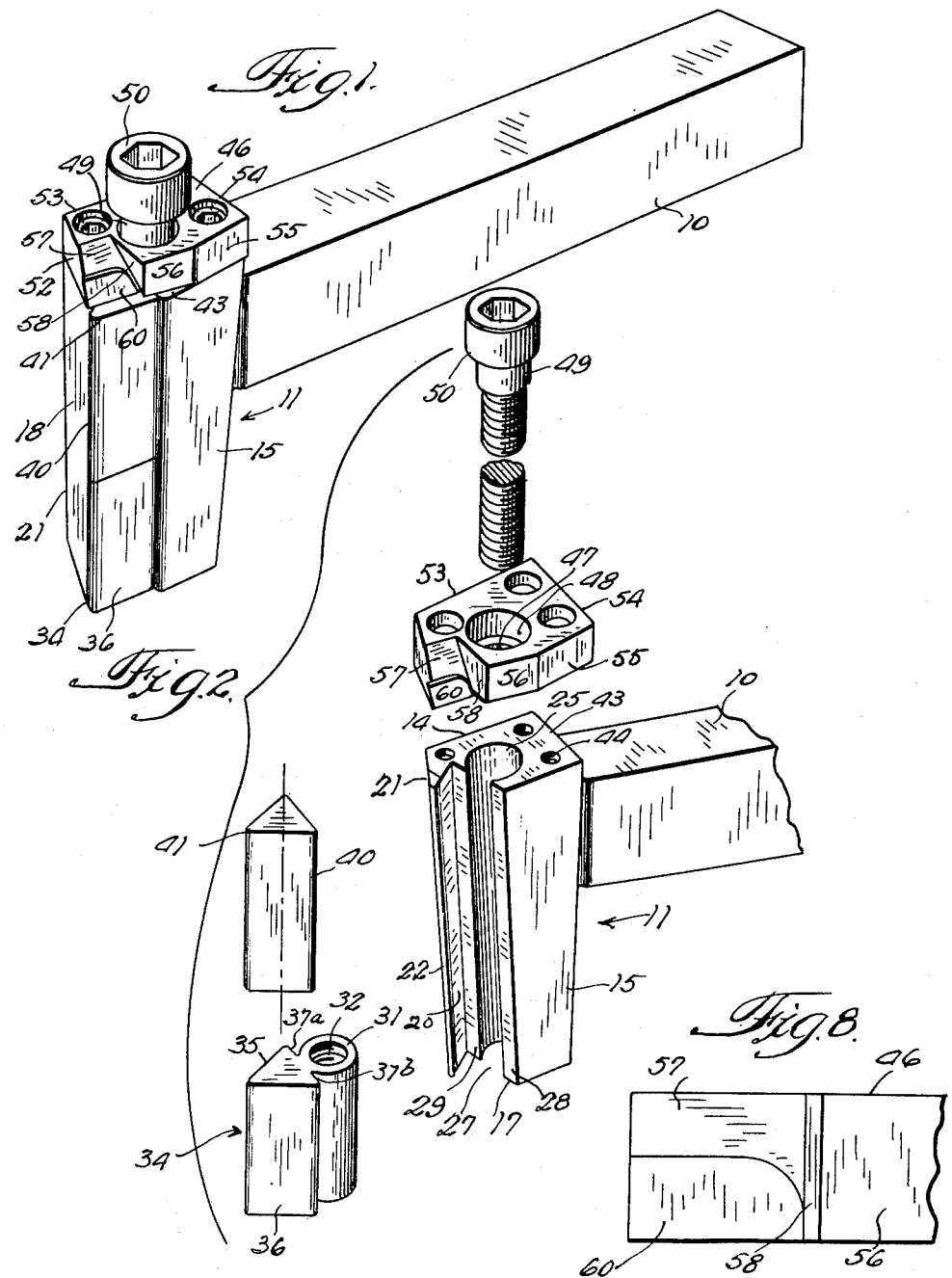
INVENTOR.
Herbert B. Clark
BY
Schneider & Dressler.

Dec. 21, 1954  H. B. CLARK  2,697,272
TOOLHOLDER
Filed Oct. 29, 1952  2 Sheets-Sheet 2
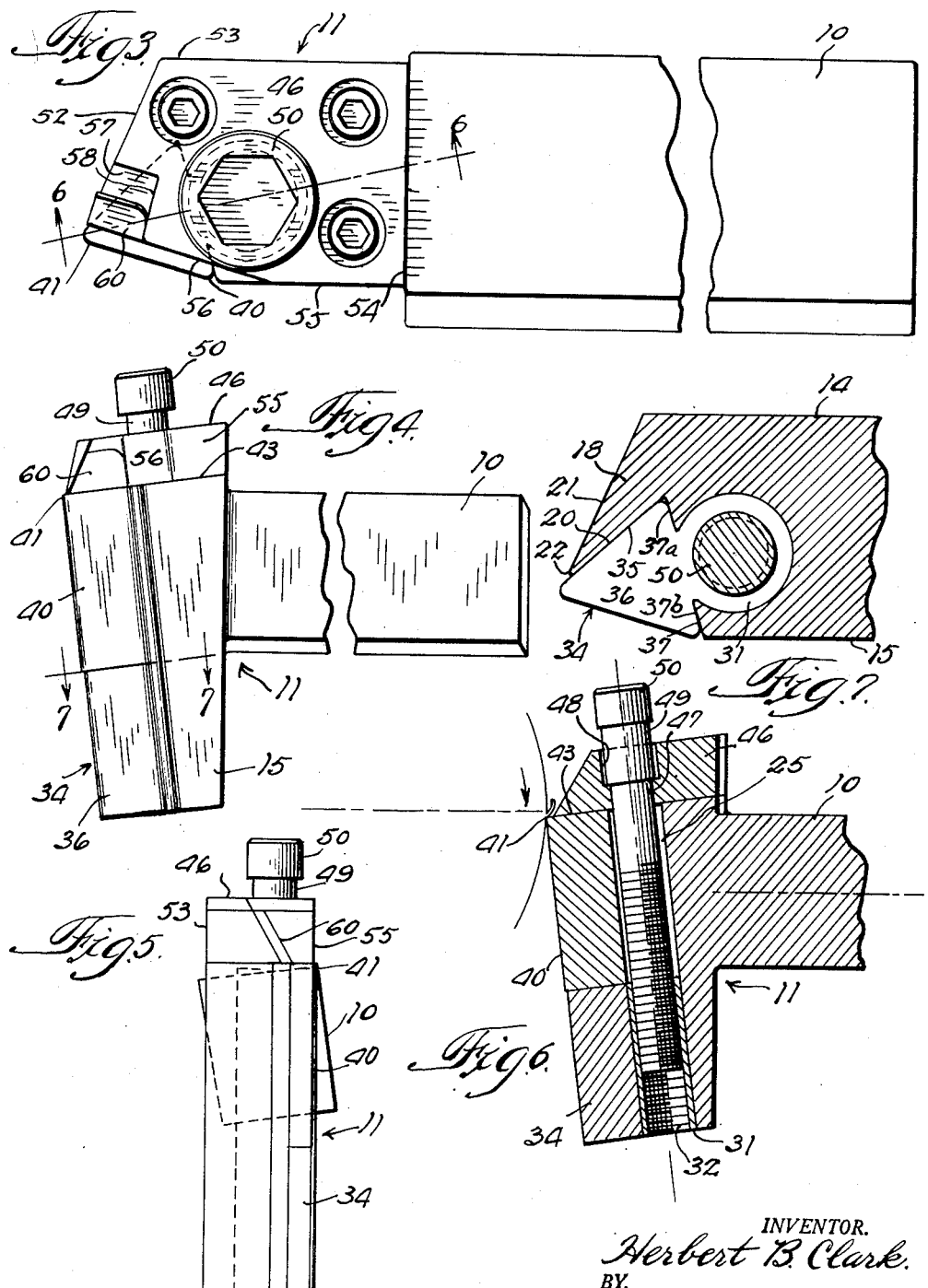
INVENTOR.
Herbert B. Clark.
BY
Schneider & Dressler
Attys.

United States Patent Office 2,697,272
Patented Dec. 21, 1954

2,697,272

TOOLHOLDER

Herbert B. Clark, Libertyville, Ill., assignor to Vascoloy-Ramet Corporation, a corporation of Delaware Application October 29, 1952, Serial No. 317,500

17 Claims. (Cl. 29—96)

This invention relates to a tool holder for use on metal working machines. While the tool holder forming the subject matter of the present invention is adapted for general use with all kinds of tool bits or inserts, it is particularly adapted for use with cemented carbide inserts or inserts of other cemented or sintered material.

Within recent years there has been a substantial trend away from a tool having a steel shank and brazed carbide tip in favor of a tool holder having a removable insert of cutting material, such as cemented carbide. The insert which may be of cemented carbide or of tool steel, or any other suitable cutting material, may be of triangular cross section or circular or quadrilateral cross section and generally has a length of about 1½". However other shapes and sizes are used.

The tool holders for holding such bits or inserts are of various kinds and types, but are characterized by a number of drawbacks. One drawback resides in the inability of the tool holder to accommodate short inserts, thus reducing the useful life of an insert of usable length. With conventional inserts of 1½" standard length, conventional tool holders do not permit the ultimate use of more than about one-half of the insert, the remainder thereof being useless as far as cutting is concerned.

In conventional prior tool holders, another drawback is that readjustment of the tool holder is required to position the cutting point on the center of the work after the insert has been removed and replaced, as when regrinding. These drawbacks are particularly serious with automatic machinery which may have as many as five or six cutting tools for successive or multiple use.

This invention makes it possible to provide a tool holder wherein a cutting insert may be used down to a size where the unused remnant has a negligible length, such as about ⅛" and even less depending upon cutting pressure. A tool holder embodying the present invention has a further desirable characteristic in that the insert may be removed and replaced quickly and the cutting tip of the insert oriented automatically in the same position as formerly. This latter advantage is highly desirable in that it eliminates any adjustment of tool holder in a machine for obtaining the proper cutting position relative to the work when the insert has been removed and replaced or has been ground or has been changed in some particular.

In addition to a tool holder, a construction embodying the present invention also provides a chip breaker which is independent of the tool bit or insert itself, but is always properly oriented with respect to the cutting tip. It follows, therefore, that a chip breaker in the new tool holder will always engage a chip under the same operating conditions and thus function either to break or divert chips away from the cutting edge or tip to a proper place for disposal.

In present tool holders where chip breakers are required, it is customary to grind a chip breaker edge into each insert. This means that an insert must be ground not only to provide a cutting tip or edge, but also to provide a chip breaker. Thus tool holders customarily known and used have suffered from the drawbacks of requiring adjustment of the tool holder after the insert has been changed, have required the additional grinding to provide chip breakers and have limited the useful length of an insert to a minimum size which is quite substantial and which, in practice, represents about one-half of the total length of insert.

In general, a tool holder embodying the present invention has means for clamping an insert at the two ends thereof, the insert being compressed or clamped between the end faces, to leave an exposed cutting edge or cutting tip. Throughout the specification and claims, the end faces of an insert are hereby defined as two spaced, generally parallel, flat faces which are ground to provide fresh cutting edges and between which faces and substantially normal thereto is a straight longitudinal insert axis substantially parallel to the travel of the work at the point of contact between the work and insert.

The new tool holder comprises an elongated straight shank at one end of which there is a clamping head embodying the novel features of construction. For ease in explanation, a conventional tool holder position will be assumed with the shank horizontal. In such a position of tool holder, the insert axis will be inclined from the vertical toward the work by a small angle, to provide proper cutter clearance. The active cutting edge will be formed by the intersection of the insert side or sides and the top end face of the insert. New cutting edges at the top end face may be presented to the work by indexing or turning the insert on its longitudinal axis. The insert may be turned upside down to present a new end face as the active top face. When the cutting edges are dull, the end faces of the insert are ground thus shortening the insert length along the insert axis.

A tool holder embodying the present invention has, with respect to the holder, a fixed clamping jaw engaging the top end face of the insert and an adjustable clamping jaw engaging the bottom end face of the insert. The fixed jaw is shaped to expose an active cutting edge on the top end face of the insert. The fixed jaw may have a part shaped to function as a chip breaker.

The new tool holder inherently orients and locates the active cutting edge in the same position with respect to the tool holder. Consequently, substantially the sole determinant of the position of the cutting tip of an insert with respect to the work will be the position of the tool holder. Indexing of the insert or changing an insert in the new tool holder will have no substantial effect on the cutter adjustment. Inasmuch as the proper indexing and positioning of an insert and tool holder for proper cutting action is of the utmost importance and usually requires substantial time, it will be clear that the reorientation feature of the new tool holder has great advantages.

Referring now to the drawing, there is shown an example of a tool holder embodying the present invention. It is understood, however, that substantial variations in and departures from the details of construction, as disclosed herein, are possible to accommodate different kinds and types of inserts and to meet different working conditions, all such variations and changes being within the scope and spirit of the invention as will be apparent later.

Referring therefore to the drawings.

Figure 1 is a perspective view of a tool holder embodying the present invention and showing an insert being clamped by the tool holder.

Fig. 2 is an exploded perspective view of the tool holder shown in Fig. 1.

Fig. 3 is a plan view of the tool holder shown in Fig. 1.

Fig. 4 is a side elevation of the tool holder shown in Fig. 1.

Fig. 5 is an end elevation of the tool holder shown in Fig. 1.

Fig. 6 is a sectional detail on line 6—6 of Fig. 3.

Fig. 7 is a section on line 7—7 of Fig. 4.

Fig. 8 is a detail of the stationary jaw illustrating the chip breaker insert.

The new tool holder has elongated shank 10 of generally conventional construction usually made of steel or any other suitable material. Shank 10 may have any desired shape and is generally of rectangular cross section. As is well known, shank 10 may be gripped in conventional clamping means provided on machines where cutting tools are used.

At one end of shank 10 is clamping head, generally indicated by numeral 11. This clamping head is usually integral with shank 10. Clamping head 11 has its longitudinal axis generally perpendicular to the longitudinal axis of shank 10. In practice, the angle between the two axes will be somewhat less than 90° as measured below the shank to provide proper clearance angles. As has been previously indicated, the horizontal position of the shank of the tool holder is assumed merely for convenience. When used in some machines, the shank may be in any position and frequently may change its position in space when an automatic machine is cycling from one cutting position to another. Therefore, the horizontal position of the tool holder will be assumed, and the words top and bottom sides will be used in connection with this assumed orientation of the tool holder purely for convenience.

In the example shown, clamping head 11 has a cross section which is generally quadrilateral, modified by a projecting lip. The shape is not important. Clamping head 11 has opposed sides 14 and 15 which are here shown generally parallel. Clamping head 11 has side 17 and projecting lip or flange 18, this latter projection, together with side 17, being disposed between sides 14 and 15 of the clamping head. Projection 18 has faces 20 and 21 which terminate at blunt or stub tip 22 of the projection.

Side 17 of the clamping head is mutilated by cylindrical bore or channel 25 extending longitudinally of the clamping head. Channel 25 is so disposed that it intersects with side 17 of the clamping head to provide throat 27 in the side. Thus, side 17 may be considered as being broken into parts 28 and 29 on opposite sides of throat 27.

Sides 29 and 20 constitute guiding surfaces for the cutting insert. Where inserts of generally triangular cross sections are used, sides 29 and 20 may be generally flat, as shown, and may conveniently have an angle of about 60° therebetween, this corresponding to the 60° angle of an insert edge. However, the sides may be curved inwardly or outwardly, or the angle may be varied to accommodate inserts of square or circular cross section, or inserts having different cross sectional shapes.

Slidably mounted within channel 25 is nut 31 dimensioned to provide a snug but smooth fit within the channel. Nut member 31 is provided with threaded recess 32. Threaded recess 32 extends as deep into nut member 31 as may be required and may conveniently extend the full length of nut member 31.

Permanently attached to the outside of nut member 31 longitudinally thereof, and generally tangent thereto, is bottom movable clamping jaw 34. Clamping jaw 34 is shown here as having a generally triangular cross section. Clamping jaw 34 has sides 35, 36 and 37, the latter side merging with nut member 31. Clamping jaw 34 and member 31 are permanently joined as by brazing or welding, or may be formed as one piece. Sides 35 and 37 have preferably the same angle between them as the angle between sides 20 and 29 of the clamping head. Side 37 of movable clamping jaw 34 has parts 37a and 37b on opposite sides of member 31, these portions of the side cooperating with guide sides 20 and 29 of the clamping head. Inasmuch as the clamping action is provided only at the end faces of the cutting insert, the provision of matching surfaces for the clamping jaw 34 and the corresponding opposed portions of the clamping head are not essential though convenient.

While the cutting insert itself forms no part of the present invention, it is convenient to describe the same so that the relationship of the tool holder to the insert will be more readily apparent. Cutting insert 40 may have any desired cross section perpendicular to its longitudinal axis and is here shown as having a triangular cross section generally similar to the end face of movable clamping jaw 34. Cutting insert 40 has active cutting edge 41. It is understood that any edge at the end faces of the insert may be used for cutting. However, when the insert is clamped in the holder as shown, the top exposed edge indicated by 41 will function for cutting and other insert edges will not be active cutting edges.

As illustrated in Fig. 6, if the shank center line is assumed to be horizontal, then the clamping head center line will be inclined from the vertical away from the shank and toward the work by a small angle. This will provide cutter clearance at the work. The clamping head center line will be substantially parallel to the line of travel of the work at the point of contact of the insert tip and work. This will be true whether the work turns, or the cutter turns or the relative movement between the cutter and work is along a straight line as in shaping. The end faces of the insert through which the insert center line passes (see Fig. 2) are generally parallel to each other and are ground to provide fresh cutting edges. The departure from exact parallelism between the clamping head center line and line of travel of the work will be the clearance angle at the point of contact with the insert will be the clearance angle.

Clamping head 11 has top surface 43 finished and is provided with a number of threaded recesses 44, these recesses extending longitudinally into the clamping head. The number and disposition of the recesses may be varied to suit requirements, these recesses matching corresponding apertures in top clamping jaw 46. Suitable bolts for anchoring the fixed jaw on the top of the clamping head are provided. Clamping jaw 46 has aperture 47 which is concentric with cylindrical channel 25 when the top clamping jaw is properly positioned. Jaw 46 is counterbored at 48 to accommodate shoulder 49 of bolt 50. Bolt 50 extends longitudinally of the clamping head within cylinder 25 and this bolt is threaded into recess 32 of nut member 31. The counterboring of jaw 46, together with the shoulder on the bolt, limits inward travel of the bolt while allowing for vertical travel of nut member 31 and movable clamping jaw 34.

Top clamping jaw 46 may have any desired shape. It is convenient to shape the top clamping jaw so that sides 52, 53 and 54 generally coincide with sides 21, 14 and the junction between the clamping head and the shank, respectively. Top clamping jaw 46 may have side 55 which corresponds to side 15 of the clamping head. The remainder of the jaw has an irregular outline formed by generally straight sides 56 and 57 connected by sloping step 58 as seen from the top. The relationship of sides 56 to 58 inclusive to the remainder of the structure is such that active cutting edge 41 of the insert is exposed. Side 57 of the top clamping jaw is preferably provided with an insert of hard material, such as cemented carbide, this providing an inclined edge adjacent the cutting bit insert to function as a chip breaker. It is understood that the chip breaker is permanently attached to the fixed jaw and the active chip breaker edge 60 is ground to a suitable shape and angle for providing desired chip breaking action.

It will be evident that the cutter insert may be removed by loosening clamping bolt 50 to drop clamping jaw 34. The insert may be easily indexed or removed for working thereon. When replacing or indexing an insert, active cutting edge 41 of the insert will always be properly positioned with reference to the tool holder. The position of guiding sides for the tool holder, together with the clamping means for the two ends of the tool holder make it easy for an insert to be properly positioned in the tool holder. The top clamping jaw being fixed with respect to the tool holder always insures the proper and precise orientation of the top face of the insert in the holder.

By virtue of the clamping action against the top and bottom of the insert, the length of the insert along the insert axis will have no effect upon the efficacy or availability of the insert active cutting edge. Providing bolt 50 and nut member 31 are properly dimensioned, it will be possible to draw movable clamping jaw 34 up as close as may be desired to the opposed clamping jaw. Thus it is clear that the length of the insert measured along the longitudinal axis of clamping head 11 may be reduced by usage of the insert to a value where the insert has little substantial length.

Instead of one lip 18, the clamping head may have a lip on either side of throat 27. The additional lip will cooperate with the insert to provide added lateral support. In all cases, the tops of the lip or lips should provide clearance for proper cutting action at the active cutting edge.

It is apparent that the bolts engaging recesses 44 in the clamping head only support the top jaw on the clamping head when the tool holder is disassembled. In the assembled position, bolt 50 has shoulder 49 which cooperates with the counterbore in the clamping head and can maintain the top jaw rigidly on the clamping head. Thus, it is evident that the auxiliary bolts threaded into recesses 44 may be omitted.

What is claimed is:

1. A tool holder comprising a shank having a clamping head at one end thereof for clamping a cutter insert, said head having an open channel extending throughout one dimension thereof, a fixed jaw carried by said head at one end of said channel, a movable jaw in said channel and means for mounting said movable jaw so that it may be moved in said channel to and from the said fixed jaw, said jaws engaging the end faces of a cutter insert to clamp the insert therebetween, one of said jaws having clearance for exposing an active cutting edge at the end face engaged thereby.

2. The tool holder according to claim 13 wherein said movable jaw covers substantially the entire insert face engaged thereby.

3. The tool holder according to claim 13 wherein said fixed jaw has a chip breaker portion disposed in proximity to said cutting edge.

4. The tool holder according to claim 13 wherein said movable jaw covers substantially the entire insert face engaged thereby and wherein said stationary jaw has a portion shaped to provide a chip breaker part.

5. A tool holder comprising an elongated shank having a clamping head at one end thereof for clamping an insert, said shank having a longitudinal axis, a clamping head at one end of said shank, said clamping head having a longitudinal axis disposed at an angle to the shank axis, a stationary clamping jaw rigidly supported on said head at one end thereof, said head having a longitudinal channel, a member movable in said channel parallel to the clamping head axis, means carried by said clamping head for cooperating with said member to move the same along the channel, a movable clamping jaw rigidly attached to said member and movable therewith, said two clamping jaws being opposed and adapted to clamp an insert therebetween at the insert end faces, said stationary clamping jaw being shaped to leave an active edge portion of the insert exposed for cutting purposes, said insert active cutting edge being at all times oriented in the same relative position to the tool holder.

6. The structure according to claim 5 wherein said stationary clamping jaw has a part thereof shaped as a chip breaker in proximity to the insert active cutting edge.

7. The tool holder according to claim 5 wherein said clamping head includes a guide portion for the movable clamping jaw, said guide portion cooperating with an unclamped side of the insert to provide lateral support.

8. The tool holder according to claim 5 wherein the clamping head is provided with a guiding portion for cooperating with the movable clamping jaw and wherein the stationary clamping jaw has a chip breaker portion adjacent the insert active cutting edge portion.

9. A tool holder comprising an elongated shank having a clamping head at one end thereof for clamping an insert, said clamping head having a longitudinal axis disposed at an angle to the shank axis, a longitudinal bore through the clamping head, a fixed clamping jaw rigidly attached to said clamping head at one end thereof, said clamping jaw covering the end of the bore and having a part extending laterally of the clamping head for clamping, a nut member slidable in said bore, a screw threadedly engaging said nut member so that said nut member may be translated within said bore by rotation of said screw, and a movable clamping jaw attached to said nut member and movable therewith, said movable jaw being opposed to said stationary jaw and cooperating therewith for clamping an insert at the end faces thereof, said movable jaw covering substantially the entire insert end face engaged thereby, said stationary jaw covering a substantial portion of the insert end face engaged thereby but leaving an active edge portion exposed and accessible for cutting purposes, whereby operation of said screw to release and clamp an insert has no tendency to change the orientation of the active cutting edge of an insert with respect to said tool holder.

10. The tool holder according to claim 9 wherein said clamping head has at least one laterally extending lip portion for guiding the movable clamping jaw and against which the side of an insert may rest.

11. The tool holder according to claim 9 wherein said stationary clamping jaw has an edge portion adjacent the insert cutting edge formed as a chip breaker.

12. The tool holder according to claim 9 wherein said clamping head has at least one laterally extending lip portion providing a guiding surface for the movable jaw and wherein said stationary clamping jaw has a portion adjacent the exposed insert face portion formed as a chip breaker.

13. A tool holder comprising a shank having a clamping head at one end thereof for clamping a cutter insert, said head having an open channel of substantially uniform cross section extending throughout one dimension thereof, a fixed jaw carried by said head at one end of said channel, a movable jaw in said channel and means for mounting said movable jaw so that it may be moved in said channel to and from the said fixed jaw, said jaws engaging the end faces of a cutter insert to clamp the insert therebetween, one of said jaws having clearance for exposing an active cutting edge at the end face engaged thereby.

14. The tool holder according to claim 9 wherein said clamping head has at least one laterally extending lip portion and a black wall portion for guiding and supporting the movable clamping jaw and against which a pair of adjacent sides of an insert may rest.

15. A tool holder comprising an elongated shank having a clamping head at one end thereof for clamping an insert, said clamping head having a longitudinal axis disposed at an angle to the shank axis, a longitudinal recess and an adjoining longitudinal bore through the clamping head, a fixed clamping jaw rigidly attached to said clamping head at one end thereof, said clamping jaw covering the end of the bore and having a part extending laterally of the recess for clamping, a nut member slidable in said bore, a screw threadedly engaging said nut member so that said nut member may be translated within said bore by rotation of said screw, and a movable clamping jaw attached to said nut member and movable therewith in said recess, said movable jaw being opposed to said stationary jaw and cooperating therewith for clamping an insert at the end faces thereof, said movable jaw covering substantially the entire insert end face engaged thereby, said stationary jaw covering a substantial portion of the insert end face engaged thereby but leaving an active edge portion exposed and accessible for cutting purposes, whereby operation of said screw to release and clamp an insert has no tendency to change the orientation of the active cutting edge of an insert with respect to said tool holder.

16. A tool holder comprising an elongated shank having a clamping head at one end thereof for clamping an insert, said clamping head having a longitudinal axis disposed at an angle to the shank axis, a longitudinal recess and an adjoining longitudinal bore through the clamping head, a fixed clamping jaw rigidly attached to said clamping head at one end thereof, said clamping jaw covering the end of the bore and having a part extending laterally of the recess for clamping, a nut member slidable in said bore, a screw threadedly engaging said nut member so that said nut member may be translated within said bore by rotation of said screw, and a movable clamping jaw attached to said nut member and movable therewith in said recess, said movable jaw being opposed to said stationary jaw and cooperating therewith for clamping an insert at the end faces thereof.

17. A tool holder comprising an elongated shank having a clamping head at one end thereof for clamping an insert, said clamping head having a longitudinal axis disposed at an angle to the shank axis, a longitudinal recess and an adjoining longitudinal bore through the clamping head, a fixed clamping jaw rigidly attached to said clamping head at one end thereof, said clamping jaw covering the end of the bore and having a part extending laterally of the recess for clamping, a nut member slidable in said bore, a screw threadedly engaging said nut member so that said nut member may be translated within said bore by rotation of said screw, a movable clamping jaw attached to said nut member and movable therewith in said recess, and means guiding and supporting said movable jaw in said recess, said movable jaw being opposed to said stationary jaw and cooperating therewith for clamping an insert at the end faces thereof.

References Cited in the file of this patent

UNITED STATES PATENTS

| Number | Name | Date |
| --- | --- | --- |
| 1,271,299 | Fish | July 2, 1918 |
| 2,166,826 | Shepherd | July 18, 1939 |
| 2,181,023 | Moore | Nov. 21, 1939 |
| 2,645,844 | Longe | July 21, 1953 |